B. G. FITZHUGH.
Improvement in Cart-Loading Apparatus.
No. 130,121. Patented Aug. 6, 1872.

Witnesses:
Annie E. Dyer
Jnst. Wagner

Inventor:
Benj. G. Fitzhugh
by Johnson Klaucke & Co
his Attorneys

UNITED STATES PATENT OFFICE.

BENJAMIN G. FITZHUGH, OF FREDERICK, MARYLAND.

IMPROVEMENT IN CART-LOADING APPARATUS.

Specification forming part of Letters Patent No. 130,121, dated August 6, 1872.

*To all whom it may concern:*

Be it known that I, BENJAMIN G. FITZHUGH, of the city and county of Frederick and State of Maryland, have invented certain new and useful Improvements in Cart-Loading Apparatus, of which the following is a specification:

My invention consists of a portable apparatus, by means of which carts can be loaded at a single operation, thus obviating the necessity of its waiting until it is loaded by hand, and another cart not being capable of being loaded until the first has gone and the next can be backed into its place, and whereby a number of carts can be successively loaded in much less time than could be done by hand, as will be hereafter more fully described.

Figure 1:
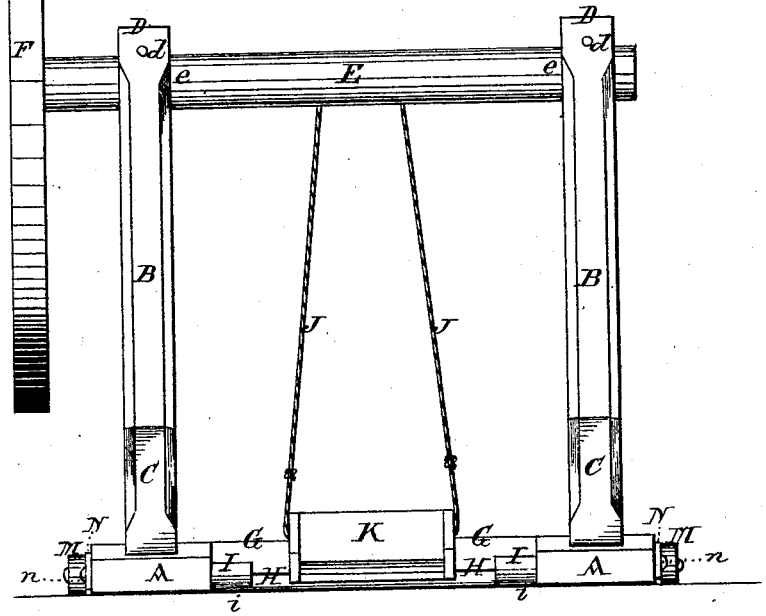
Figure 2:
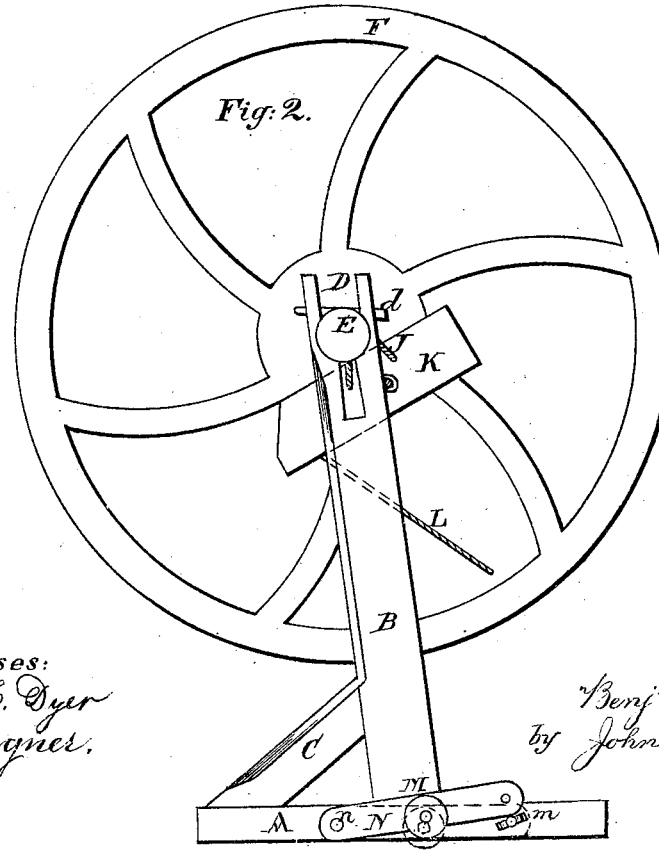

In the accompanying drawing, Figure 1 represents a front elevation of my improved cart-loading apparatus, the box being shown as on the ground while being filled. Fig. 2 represents an end view, the box being shown as raised and in the act of dumping. The frame of my cart-loading apparatus consists of two bottom pieces, A, from which rise two uprights, B, which incline forward and are braced by means of brace-pieces C, and are forked at their upper ends, as shown at D, which forks serve as bearings for the horizontal shaft E at the points where it lies in the bearings is reduced, and thus forms shoulders e, which, bearing against the ends of the upright B, prevent any lateral motion of the shaft. Pins d, passing through the ends D, keep the shaft in its bearings vertically. At one end the shaft E carries a hand-wheel, F, of sufficient diameter to allow it to be rotated by a person standing on the ground. The bottom pieces A are connected to each other at the rear by a piece, G, standing on end, and at the front by a flat piece, H. On the inner sides of the bottom pieces are formed ways I, the front ends i of which are rounded off, and these ways are sufficiently apart from each other to allow any common cart to back up on them. To the shaft E are secured the ropes or chains J of a dumping-box, K, which are so attached to the box as to keep the same suspended level. The box K, being filled with dirt, sand, or any other substance to be carted away, is elevated by revolving the hand-wheel F, the cart to be loaded backed up under the shaft on the ways I, their rounded ends i allowing the wheels of the cart to get on them easily, the rear piece G stopping the cart when it is in position and the hand-wheel revolved until the shaft bears on the sides of the box, and, by means of the leverage of the cords, dumps it, thereby discharging the load into the cart. The box K is preferably made of a size sufficient to hold a full load, and its dumping may be assisted by a rope or chain, L, attached to the bottom of the box, near its forward end, and which rope or chain, when not used, may be hooked over a pin, i, on the rear bar of the box. The cart is driven from under the shaft, and while one cart drives out and another backs in the box has been rapidly lowered, filled, and raised again; and the filling by hand of the box is done more rapidly than the filling of a cart, by reason of the laborers not being obliged to throw every shovelful upward, but merely on a level with the ground. This apparatus is made movable from place to place by means of wheels M on side pieces N, which pieces N are pivoted at their forward end at n, while a pin or thumb-screw, m, holds the rear end in position. By withdrawing the pins m the pieces N are allowed to move upwardly and allow the pieces to rest on the ground. When the pieces N are held by the pins m the apparatus may be moved on the wheel M, as the bottom pieces A are then raised off the ground, as shown in Fig. 2. Two such pieces, N, with wheels M, may be used on each side, thus facilitating the removal of the apparatus.

Having described my invention, I claim—

A cart-loading apparatus, constructed and operating essentially as herein described.

The above specification of my improved cart-loading apparatus signed this 2d day of February, 1872.

B. G. FITZHUGH.

Witnesses:
A. E. H. JOHNSON,
J. W. HAMILTON JOHNSON.